(12) United States Patent
Murata (10) Patent No.: US 9,591,151 B2
(45) Date of Patent: Mar. 7, 2017

(54) INFORMATION SHARING SYSTEM, INFORMATION SHARING METHOD, AND CONNECTING DEVICE

(71) Applicant: Jun Murata, Tokyo (JP)

(72) Inventor: Jun Murata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 14/465,774

(22) Filed: Aug. 21, 2014

(65) Prior Publication Data

US 2015/0054968 A1 Feb. 26, 2015

(30) Foreign Application Priority Data

Aug. 23, 2013 (JP) ................. 2013-173999

(51) Int. Cl.
| | | |
|---|---|---|
| H04N 1/00 | (2006.01) | |
| G06F 3/14 | (2006.01) | |
| G06F 21/44 | (2013.01) | |
| G06F 21/62 | (2013.01) | |
| H04L 29/06 | (2006.01) | |
| G06F 21/32 | (2013.01) | |

(52) U.S. Cl.
CPC ....... *H04N 1/00244* (2013.01); *G06F 3/1454* (2013.01); *G06F 21/44* (2013.01); *G06F 21/6218* (2013.01); *H04L 63/10* (2013.01); *H04N 1/00129* (2013.01); *H04N 1/00214* (2013.01); *G06F 21/32* (2013.01); *G09G 2358/00* (2013.01); *G09G 2370/16* (2013.01)

(58) Field of Classification Search
CPC ......... H04N 1/00; H04N 2101/00; G06F 3/14
USPC ........................................................ 725/105
See application file for complete search history.

(56) References Cited

U.S. PATENT DOCUMENTS

| | | | |
|---|---|---|---|
| 2011/0314094 A1 | 12/2011 | De Oliveira Antunes | |
| 2014/0282959 A1* | 9/2014 | Mechaley, Jr. | ......... G06F 21/36 726/7 |
| 2016/0021336 A1* | 1/2016 | Abbott | .................... H04N 7/141 348/14.02 |
| 2016/0021340 A1* | 1/2016 | Kato | .................. H04N 1/00217 348/14.04 |

FOREIGN PATENT DOCUMENTS

| | | |
|---|---|---|
| JP | 2003-044598 | 2/2003 |
| JP | 2012-519322 | 8/2012 |
| JP | 2014-219807 A | 11/2014 |

\* cited by examiner

*Primary Examiner* — Tuan Ho (74) *Attorney, Agent, or Firm* — Harness, Dickey & Pierce, P.L.C.

(57) ABSTRACT

In the present invention concerning an information sharing system, a connecting device sets a destination to share information. The connecting device communicates with a terminal device by wireless communication, and performs authentication of the terminal device, which obtains a captured image by capturing an image of a subject, and transfers the captured image received from the authenticated terminal device to the destination, and then generates display information for displaying the captured image. The connecting device transmits the generated display information to a display sharing device, which displays thereon a screen based on information acquired through communication.

20 Claims, 8 Drawing Sheets

INFORMATION SHARING SYSTEM, INFORMATION SHARING METHOD, AND CONNECTING DEVICE

CROSS-REFERENCE TO RELATED APPLICATIONS

The present application claims priority to and incorporates by reference the entire contents of Japanese Patent Application No. 2013-173999 filed in Japan on Aug. 23, 2013.

BACKGROUND OF THE INVENTION

1. Field of the Invention

The present invention relates to an information sharing system, information sharing method, and connecting device for sharing information among multiple users.

2. Description of the Related Art

Conventionally, blackboards and whiteboards are used as a means to share information among multiple participants in a meeting, a lecture, or a class, etc. In recent years, there are shown signs of widespread use of an interactive whiteboard (hereinafter, referred to as an "IWB") that displays thereon information written on a whiteboard as image data.

An IWB is configured as a so-called touch panel whose front writing surface is composed of a display device and a pointing device integrally and configured to output a signal according to the touch position. Furthermore, the IWB generally incorporates a central processing unit (CPU), a read-only memory (ROM), a random access memory (RAM), and a communication interface for performing network communication, and has the same functions as a computer.

The IWB acquires, for example, information written on the writing surface thereof by a user with a dedicated pen as image data by means of a touch panel function, and displays the image data on the display device composing the writing surface. Furthermore, the IWB can store the acquired image data in a memory or output the acquired image data to the outside through the communication interface. Moreover, the IWB can receive image data supplied from the outside through the communication interface and display the image data on the display device composing the writing surface.

Meanwhile, there has been increasing cases where an information sharing system is introduced into an educational establishment, etc. in recent years (see Japanese National Publication of International Patent Application No. 2012-519322). In an educational establishment, it is often the case that many users (students) are gathered in a specific place, such as a classroom, and share information. For example, a system in which multiple computers are interconnected by a network such as a local area network (LAN) is constructed, and a teacher and students are assigned the multiple computers connected to the network, respectively. Then, in this system, the teacher and students conduct a class, etc. while sharing information via the network through the use of the computers assigned to them.

The introduction of the above-described IWB into such an educational establishment makes it easier to share information, and is expected to achieve better educational outcomes. For example, an IWB is connected to a network, and information written on the IWB by a teacher can be transmitted to students' computers via the network and displayed on the students' computers, and information input from any student's computer can be displayed on the IWB.

However, conventionally, there is a problem that when an information sharing system is introduced into, for example, a classroom, it is necessary to construct a network system in the classroom in advance, which is costly. Furthermore, in this case, the information sharing system can be used only in the specific classroom where the network system has been constructed, and this is inconvenient.

Moreover, even when an IWB is connected to the already-constructed network system, a user is required to have a certain degree of knowledge about a network, and has to perform setting work on a network to connect the IWB; therefore, there is a problem that it is not easy to connect the IWB.

In view of the above, there is a need to make it easier to construct an information sharing system including an IWB.

SUMMARY OF THE INVENTION

It is an object of the present invention to at least partially solve the problems in the conventional technology.

According to the present invention, there is provided an information sharing system comprising a display sharing device, a terminal device, and a connecting device, wherein the display sharing device includes: a first communication unit that performs communication with an external device; and a display unit that displays thereon a screen based on information acquired through the first communication unit, the terminal device includes: an image capturing unit that obtains a captured image by capturing an image of a subject; and a first wireless communication unit that performs wireless communication with an external device, and the connecting device includes: a second communication unit that connects to the first communication unit and performs communication with the display sharing device; a second wireless communication unit that connects to the first wireless communication unit by wireless communication and performs communication with the terminal device; an authenticating unit that performs authentication of the terminal device through the wireless communication performed by the second wireless communication unit; a first storage unit that stores therein information; a setting unit that sets a destination to share information in the first storage unit; and a control unit that transfers the captured image, which has been transmitted from the terminal device authenticated by the authenticating unit and received by the second wireless communication unit, to the destination to share set by the setting unit, and generates display information for displaying the captured image and transmits the generated display information to the display sharing device.

The present invention also provides an information sharing method comprising: a communication step of communicating with a display sharing device that displays thereon a screen based on information acquired through communication; a wireless communication step of performing communication with a terminal device, which acquires a captured image by capturing an image of a subject, by wireless communication; an authenticating step of performing authentication of the terminal device that performs the communication at the wireless communication step; a setting step of setting a destination to share information; a transfer step of transferring the captured image received from the terminal device authenticated at the authenticating step to the destination to share set at the setting step; a generating step of generating display information for displaying the captured image received from the terminal device authenticated at the authenticating step; and a transmitting step of transmitting the display information generated at the generating step to the display sharing device.

The present invention also provides a connecting device comprising: a communication unit that communicates with a display sharing device which displays thereon a screen based on information acquired through communication; a wireless communication unit that performs communication with a terminal device, which acquires a captured image by capturing an image of a subject, by wireless communication; an authenticating unit that performs authentication of the terminal device, which performs communication with the wireless communication unit; a storage unit that stores therein information; a setting unit that sets a destination to share information in the storage unit; and a control unit that transfers the captured image, which has been transmitted from the terminal device authenticated by the authenticating unit and received by the wireless communication unit, to the destination to share set by the setting unit, and generates display information for displaying the captured image and transmits the generated display information to the display sharing device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an information sharing system, an information sharing method, and a connecting device will be explained in detail below with reference to accompanying drawings.

First Embodiment

Figure 1:
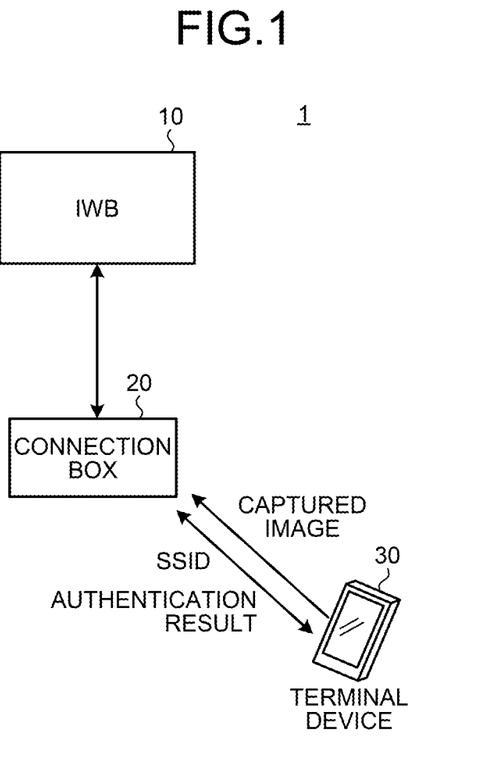
FIG. 1 is a diagram showing a configuration of an example of an information sharing system according to a first embodiment of the present invention.

FIG. 1 is a diagram showing a configuration of an example of an information sharing system according to a first embodiment of the present invention. In FIG. 1, an information sharing system 1 includes an interactive whiteboard (IWB) 10 which is a display sharing device, a connection box 20, and one or more terminal devices 30.

The IWB 10 includes an at least predetermined-sized display unit that displays thereon an image, an input unit that receives user input, and a communication unit that performs communication with an external device. The IWB 10 displays an image of information on the display unit, thereby enabling many people to share the information. The terminal devices 30 have an image capturing function and a wireless communication function, and can transmit a captured image acquired by the image capturing function to the outside by means of the communication function. As the terminal devices 30, smartphones and tablet personal computers (PCs) can be applied. The connection box 20 controls communication between the IWB 10 and the terminal devices 30.

In the information sharing system 1 configured as above, when the IWB 10 has been activated, the connection box 20 initiates communication with the IWB 10 and assigns an address used in communication to the IWB 10. Incidentally, here, the connection box 20 and the IWB 10 are connected by a wire communication channel.

When the terminal devices 30 have been activated, the connection box 20 initiates wireless communication with the terminal devices 30 and assigns addresses used in communication to the terminal devices 30, respectively. Furthermore, the connection box 20 performs authentication of the terminal devices 30 by a predetermined procedure through the communication. When the terminal devices 30 have been certified by the connection box 20, the terminal devices 30 can perform data communication with the connection box 20.

Each terminal device 30 transmits a captured image obtained by taking an image of a subject in accordance with a user operation to the connection box 20. The connection box 20 stores the captured image transmitted from the terminal device 30 in a storage unit thereof, and transmits the captured image to the IWB 10. The IWB 10 displays the captured image transmitted from the connection box 20 on the display unit. When the terminal device 30 has further transmitted a captured image, the connection box 20 additionally stores the captured image in the storage unit, and transmits the captured image to the IWB 10 and causes the IWB 10 to display the captured image on the display unit in addition to the already-displayed captured image. Accordingly, the information sharing system 1 enables many people to share captured images captured by the terminal devices 30 through the IWB 10.

In this way, in the information sharing system 1, communication between the IWB 10 and each terminal device 30 is performed through the connection box 20, and the connection box 20 assigns an address required for the communication to the terminal device 30 and authenticates the terminal device 30; therefore, the workload in cumbersome setting work performed at the time of communication is reduced. Furthermore, by making the connection box 20 portable, an image acquired by each terminal device 30 can be shared by many people even in a place where networking equipment is not set up.

Figure 2:
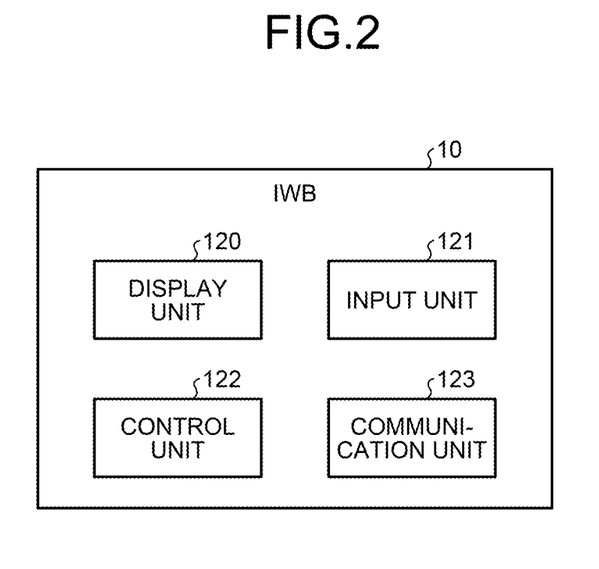
FIG. 2 is an example of a functional block diagram for explaining functions of an IWB.

Subsequently, the information sharing system 1 according to the first embodiment is explained in more detail. FIG. 2 shows an example of a functional block diagram for explaining functions of the IWB 10. In FIG. 2, the IWB 10 includes a display unit 120, an input unit 121, a control unit 122, and a communication unit 123.

The display unit 120 includes a display element, such as a liquid crystal display (LCD), and a display driving unit that drives the display element in accordance with a display signal. The input unit 121 is integral with the display unit 120, and outputs a control signal according to position specified by a touch or the like. That is, in the IWB 10, a so-called touch panel is composed of the display unit 120 and the input unit 121.

The control unit 122 includes, for example, a central processing unit (CPU), a read-only memory (ROM), and a random access memory (RAM), and controls the entire IWB 10 by the operation of the CPU using the RAM as a working memory in accordance with a program stored in the ROM in advance. Furthermore, the control unit 122 generates a display signal, for example, on the basis of a display control signal supplied from the outside, and supplies the generated display signal to the display unit 120. A screen according to the display signal is displayed on the display unit 120.

For example, the control unit 122 includes a function of a network browser application (hereinafter, abbreviated as "browser"), and can generate a display signal in accordance with a display control signal composed on the basis of, for example, hypertext markup language (HTML). Accordingly, the control unit 122 can display a screen according to HTML description on the display unit 120.

The communication unit 123 controls communication with the outside. For example, the communication unit 123 is based on TCP/IP (Transmission Control Protocol/Internet Protocol) as a communication protocol, and can connect to a wired local area network (LAN). The communication protocol of the communication unit 123 is not limited to TCP/IP; furthermore, the connection configuration is not limited to wired connection, and can be wireless connection. Incidentally, a communication interface (I/F) as hardware controlled by the communication unit 123 can be identified by a MAC (Media Access Control) address used as identification information.

Figure 3:
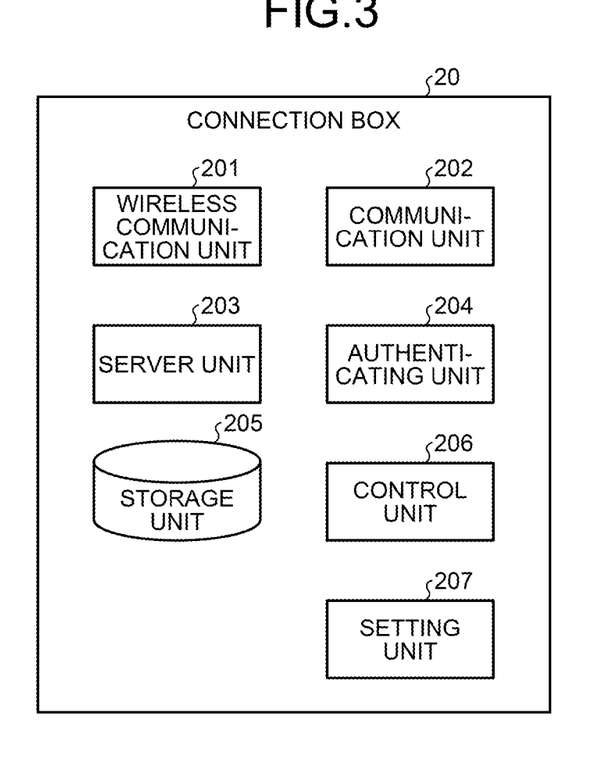
FIG. 3 is an example of a functional block diagram for explaining functions of a connection box according to the first embodiment.

FIG. 3 shows an example of a functional block diagram for explaining functions of the connection box 20 according to the first embodiment. The connection box 20 includes a wireless communication unit 201, a communication unit 202, a server unit 203, an authenticating unit 204, a storage unit 205, a control unit 206, and a setting unit 207.

Some or all of the wireless communication unit 201, the communication unit 202, the server unit 203, the authenticating unit 204, the control unit 206, and the setting unit 207 included in the connection box 20 can be configured as pieces of hardware that operate in cooperation with one another, or can be configured as a program running on a CPU (not shown).

The wireless communication unit 201 and the communication unit 202 use TCP/IP as a communication protocol, and control network communication with an external device. The wireless communication unit 201 has a function as an access point (AP) that controls wireless communication conforming to Wi-Fi (Wireless Fidelity) standards. The communication unit 202 controls wired communication conforming to Ethernet (trademark).

The server unit 203 is a server for communication of the wireless communication unit 201 and the communication unit 202, and assigns an address for communication to a destination device connected by the wireless communication unit 201 or the communication unit 202 and sets a communication path. The server unit 203 has functions of, for example, a DHCP (Dynamic Host Configuration Protocol) server and a router for relaying multiple networks. Using the router function, the server unit 203 performs relay between network communication by the wireless communication unit 201 and network communication by the communication unit 202.

The authenticating unit 204 performs authentication of a device connected by the wireless communication unit 201 or the communication unit 202. For example, the authenticating unit 204 performs authentication using a service set identifier (SSID) on a device connected by the wireless communication unit 201, and sets the wireless communication unit 201 as a communication destination of the device.

The storage unit 205 stores therein information. The control unit 206 includes, for example, a CPU, a ROM, and a RAM, and controls the entire connection box 20 by the operation of the CPU using the RAM as a working memory in accordance with a program stored in the ROM in advance. Furthermore, the control unit 206 generates a display control signal for displaying a screen on the display unit 120 of the IWB 10. The generated display control signal is transmitted from the communication unit 202 to the IWB 10.

The control unit 206 can further include a function that the IWB 10 and the terminal devices 30 can use. This function is provided, for example, as an addable and deletable plug-in program, and is added to the basic functions of the control unit 206. By adding multiple different plug-in programs, the control unit 206 can cause the IWB 10 and the terminal devices 30 to select and use any one of multiple functions corresponding to the plug-in programs.

The setting unit 207 sets, in the storage unit 205, a destination to share information between the IWB 10 and the terminal devices 30.

Figure 4:
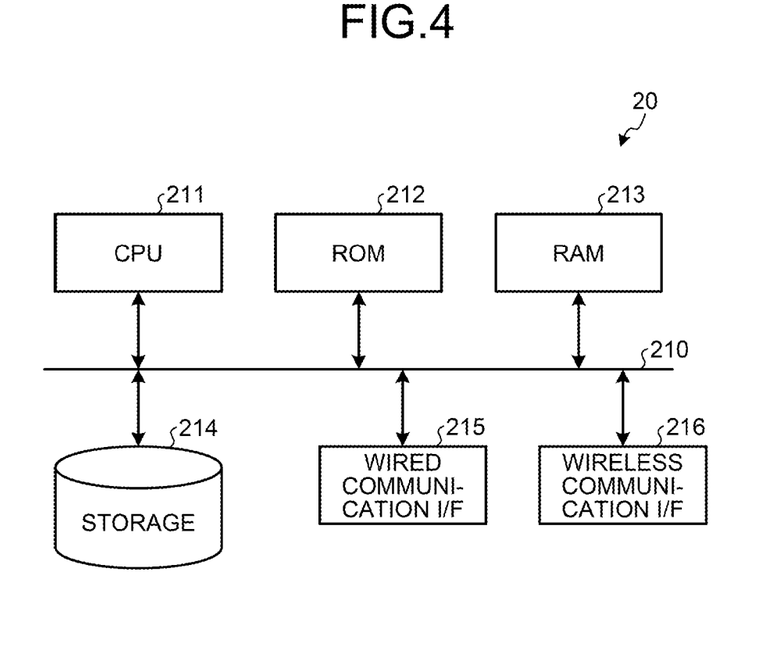
FIG. 4 is a block diagram showing an example of a hardware configuration of the connection box according to the first embodiment.

FIG. 4 shows an example of a hardware configuration of the connection box 20 according to the first embodiment. In the connection box 20 shown in FIG. 4, a CPU 211, a ROM 212, and a RAM 213 are connected to a bus 210. The CPU 211, the ROM 212, and the RAM 213 correspond to the control unit 206 shown in FIG. 3.

In the connection box 20, storage 214, a wired communication I/F 215, and a wireless communication I/F 216 are further connected to the bus 210. A non-volatile semiconductor memory, such as a flash memory, is used as the storage 214, and a variety of information in the connection box 20 is stored in the storage 214. The storage 214 is not limited to this, and a hard disk drive can be used as the storage 214. Furthermore, the storage 214 can store therein a program to be run on the CPU 211.

A communication cable is connected to the wired communication I/F 215, and the wired communication I/F 215 performs communication via the communication cable in accordance with control by the communication unit 202. The wireless communication I/F 216 includes a component such as an antenna for performing wireless communication, and performs wireless communication in accordance with control by the wireless communication unit 201. A MAC address of each of the wired communication I/F 215 and the wireless communication I/F 216 is stored in a built-in ROM (not shown) in advance.

Figure 5:
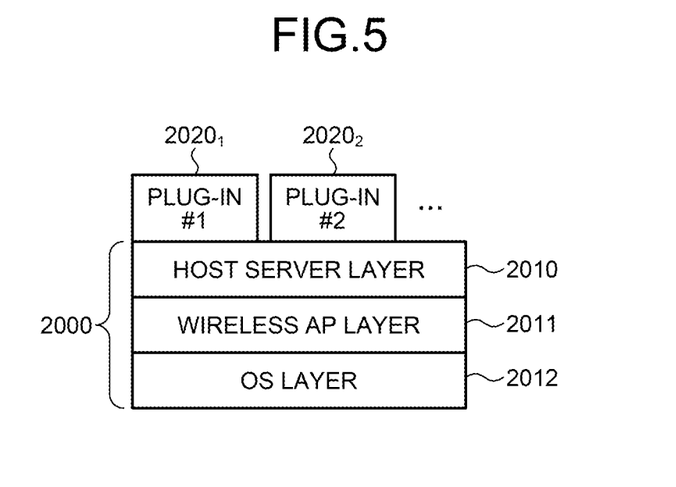
FIG. 5 is a diagram schematically showing a configuration of an example of an information sharing program for realizing the functions of the information sharing system in the connection box according to the first embodiment.

FIG. 5 schematically shows a configuration of an example of an information sharing program for realizing the functions of the information sharing system in the connection box 20 according to the first embodiment. In FIG. 5, an information sharing program 2000 includes a host server layer 2010, a wireless access point (AP) layer 2011, and an operating system (OS) layer 2012 in order from the higher layer.

The host server layer 2010 includes a host server that provides a service for executing plug-in programs $2020_1$, $2020_2$, .... Incidentally, in FIG. 5, the plug-in programs $2020_1$ and $2020_2$ are denoted by plug-in #1 and plug-in #2, respectively. The host server manages the plug-in programs $2020_1$, $2020_2$, ..., and mediates between the plug-in programs $2020_1$, $2020_2$, ... and the OS layer 2012.

The wireless AP layer 2011 is a part for realizing a function of wireless communication conforming to Wi-Fi standards, and includes a DHCP server function and a router function. For example, the wireless AP layer 2011 includes the wireless communication unit 201, the communication unit 202, the server unit 203, and the authenticating unit 204 described above.

The OS layer 2012 includes an OS for controlling the operation of the entire information sharing program 2000. That is, the OS layer 2012 includes the control unit 206 described above. The OS includes various services in which functions of the host server and the wireless AP layer 2011 and the plug-in programs $2020_2$, $2020_2$, ... can be used in common.

Incidentally, although not shown in FIG. 5, the information sharing program 2000 includes a hardware I/F layer, which mediates between the OS layer 2012 and hardware such as the storage 214, the wired communication I/F 215, and the wireless communication I/F 216, under the OS layer 2012.

The information sharing program 2000 according to the first embodiment is provided in a manner recorded on a non-transitory computer-readable recording medium, such as a compact disk (CD) or a digital versatile disk (DVD), in an installable or executable file format.

Furthermore, the information sharing program 2000 according to the first embodiment can be provided in such a manner that the information sharing program 2000 is stored on a computer connected to a communication network such as the Internet so that a user can download it via the communication network. Moreover, the information sharing program 2000 can be provided or distributed via a communication network such as the Internet.

The information sharing program 2000 according to the first embodiment is composed of, for example, modules including the above-described units (the wireless communication unit 201, the communication unit 202, the server unit 203, the authenticating unit 204, the control unit 206, and the setting unit 207), and the CPU 211 as actual hardware reads out the information sharing program 2000 from, for example, the storage 214 and executes the information sharing program 2000, thereby the above-described units are loaded onto main storage (for example, the RAM 213), and these units are generated on the main storage.

Figure 6:
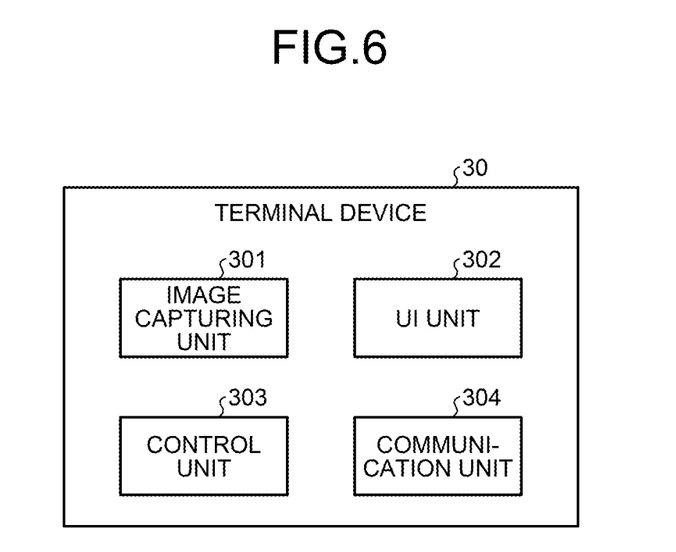
FIG. 6 is an example of a functional block diagram for explaining functions of a terminal device according to the first embodiment.

FIG. 6 shows an example of a functional block diagram for explaining functions of the terminal device 30 according to the first embodiment. The terminal device 30 includes an image capturing unit 301, a user interface (UI) unit 302, a control unit 303, and a communication unit 304. The control unit 303 includes, for example, a CPU, a ROM, and a RAM, and controls the entire terminal device 30 by the operation of the CPU using the RAM as a working memory in accordance with a program stored in the ROM in advance.

The image capturing unit 301 performs predetermined signal processing on a captured image signal obtained by capturing an image of a subject with an image pickup device, such as a charge coupled device (CCD) or a complementary metal-oxide semiconductor (CMOS) imager, and outputs the processed signal as digital data of the captured image signal. The UI unit 302 performs information presentation to a user and acceptance of user input through a screen display.

The communication unit 304 uses TCP/IP as a communication protocol, and controls network communication with an external device performed in conformity to Wi-Fi standards.

In such a configuration, when the IWB 10 has been connected to the connection box 20, the connection box 20 assigns an address to the IWB 10 and transmits a display control signal for displaying an initial screen to the IWB 10. The IWB 10 displays the initial screen, for example, with the browser in accordance with the display control signal transmitted from the connection box 20. On this initial screen, manipulators (such as buttons) for selecting any of functions that can be used by the plug-in programs $2020_1$, $2020_2$, ..., etc. in the connection box 20 are displayed.

A user performs an input operation to specify an intended function with respect to the IWB 10 in accordance with a selection display on the initial screen of the IWB 10. Here, assume that the connection box 20 has the plug-in program $2020_1$ for realizing a function of browsing a captured image, and this browsing function has been selected through the initial screen. The IWB 10 transmits a notification indicating the selected function to the connection box 20. When the connection box 20 has received the function designation notification transmitted from the IWB 10, the connection box 20 activates the selected function, and the setting unit 207 sets an area to be a destination to share information obtained through the use of the function in the storage unit 205.

On the other hand, with respect to a connection from a terminal device 30, the connection box 20 performs assignment of an address and authentication based on an SSID. The connection box 20 notifies the certified terminal device 30 of information indicating the function designated in the IWB 10. Incidentally, when the terminal device 30 does not have an application program (hereinafter, abbreviated as "app") for realizing the notified function, the terminal device 30 can acquire the app by connecting to, for example, a vendor server.

The terminal device 30 activates the function notified from the connection box 20, and executes an action with respect to the function. When the notified function is a function of browsing a captured image, an image capturing operation by the image capturing unit 301 is performed in accordance with a user operation. The image capturing unit 301 transmits a captured image acquired through the image capturing from the communication unit 304 to the connection box 20.

Incidentally, the terminal device 30 can set a group to which the captured image belongs with respect to the captured image. For example, the terminal device 30 adds group identifying information indicating a group to a captured image, and transmits the captured image added with the group identifying information to the connection box 20. The terminal device 30 can acquire information indicating a group in accordance with a user operation performed on the UI unit 302. In this case, the terminal device 30 can specify a group with respect to each captured image.

Besides this, information indicating a group can be set with respect to each terminal device 30 when respective pieces of identification information of the terminal devices 30 have been found out in advance. According to this, when multiple terminal devices 30 are used in the information sharing system 1, captured images transmitted from the terminal devices 30 can be grouped by each terminal device 30.

As a first example of setting information indicating a group with respect to each terminal device 30, the connection box 20 can store identification information of each terminal device 30 and group identifying information in an associated manner, for example, in the storage unit 205 in advance.

In this case, as the identification information of each terminal device 30, a MAC address which can be acquired through communication with the terminal device 30 can be used. When the connection box 20 receives a captured image from a terminal device 30, the connection box 20 acquires identification information of the terminal device 30. The connection box 20 retrieves group identifying information corresponding to the acquired identification information, and adds the obtained group identifying information to the captured image transmitted from the terminal device 30.

As a second example of setting information indicating a group with respect to each terminal device 30, the connection box 20 can display information which identifies groups on the IWB 10, and a terminal device 30 can acquire group identifying identification by taking an image of this display.

Figure 7:
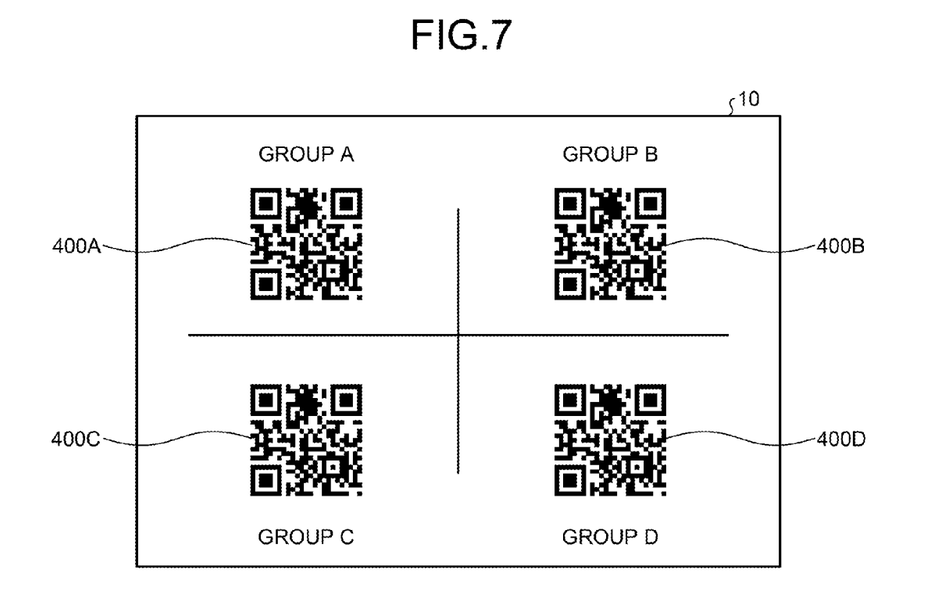
FIG. 7 is a diagram showing an example where matrix two-dimensional codes are displayed on the IWB according to the first embodiment.

In this case, the connection box 20 can display, for example, a matrix two-dimensional code such as a QR code (trademark) embedded with group identifying information on the IWB 10. FIG. 7 shows an example where matrix two-dimensional codes are displayed on the IWB 10 according to the first embodiment. In FIG. 7, matrix two-dimensional codes 400A to 400D embedded with pieces of group identifying information of groups A to D, respectively, are displayed on the IWB 10.

A user selects a code corresponding to a group to which the user belongs (for example, the matrix two-dimensional code 400A) out of the matrix two-dimensional codes 400A to 400D, and captures an image of the selected matrix two-dimensional code 400A with user's terminal device 30. The terminal device 30 analyzes the captured image and extracts group identifying information embedded in the matrix two-dimensional code 400A. The terminal device 30 adds the group identifying information extracted from the matrix two-dimensional code 400A to a captured image of a subject captured by the image capturing unit 301, and transmits the captured image added with the group identifying information to the connection box 20.

Incidentally, the connection box 20 can display group identifying information represented as a character string on the IWB 10. Furthermore, the connection box 20 can sequentially display different pieces of group identifying information on the IWB 10.

When the connection box 20 has received the captured image from the terminal device 30, the connection box 20 stores the captured image in an area in the storage unit 205 set as a destination to share, and generates a display control signal for displaying the captured image. The connection box 20 transmits the generated display control signal to the IWB 10. For example, each time the connection box 20 has received a captured image from a terminal device 30, the connection box 20 generates a display control signal and transmits the generated display control signal to the IWB 10. The IWB 10 displays a screen including the captured image on the display unit 120 in accordance with the display control signal transmitted from the connection box 20.

Figure 8:
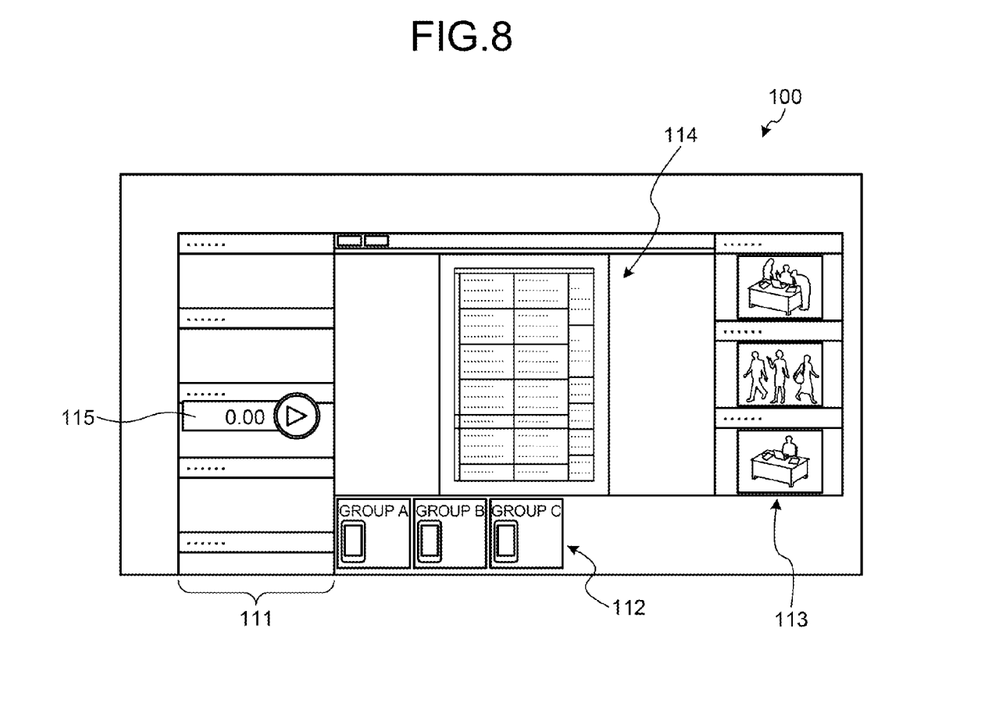
FIG. 8 is a diagram showing an example of a screen including captured images displayed on the IWB according to the first embodiment.

FIG. 8 shows an example of a screen including captured images displayed on the display unit 120 of the IWB 10 in accordance with a display control signal transmitted from the connection box 20 according to the first embodiment. In this example, multiple terminal devices 30 are connected to the information sharing system 1, and the terminal devices 30 are grouped into several groups.

In FIG. 8, a display screen 100 includes display areas 111, 112, 113, and 114. In the display area 111, a captured image transmitted from a specific terminal device 30 to the connection box 20 or a list of certain images stored in the storage unit 205 of the connection box 20 in advance is displayed. In the display area 112, a list of groups to which the terminal devices 30 belong is displayed. In the display area 113, a list of captured images corresponding to a specified group out of the groups displayed in the display area 112 is displayed in chronological order, for example, according to time information transmitted to the connection box 20. An operation to specify an object on the display screen 100 is performed by a user operation, such as a touch to the input unit 121 of the IWB 10. In the display area 114, an enlarged image specified out of the images displayed in the display area 111 is displayed. By manipulating a manipulator 115 placed on the display area 111, an image displayed in the display area 114 can be changed.

Incidentally, a captured image stored in the storage unit 205 of the connection box 20 can be read out from the storage unit 205 and displayed on the display unit 120 of the IWB 10.

Application Example of First Embodiment

Figure 9:
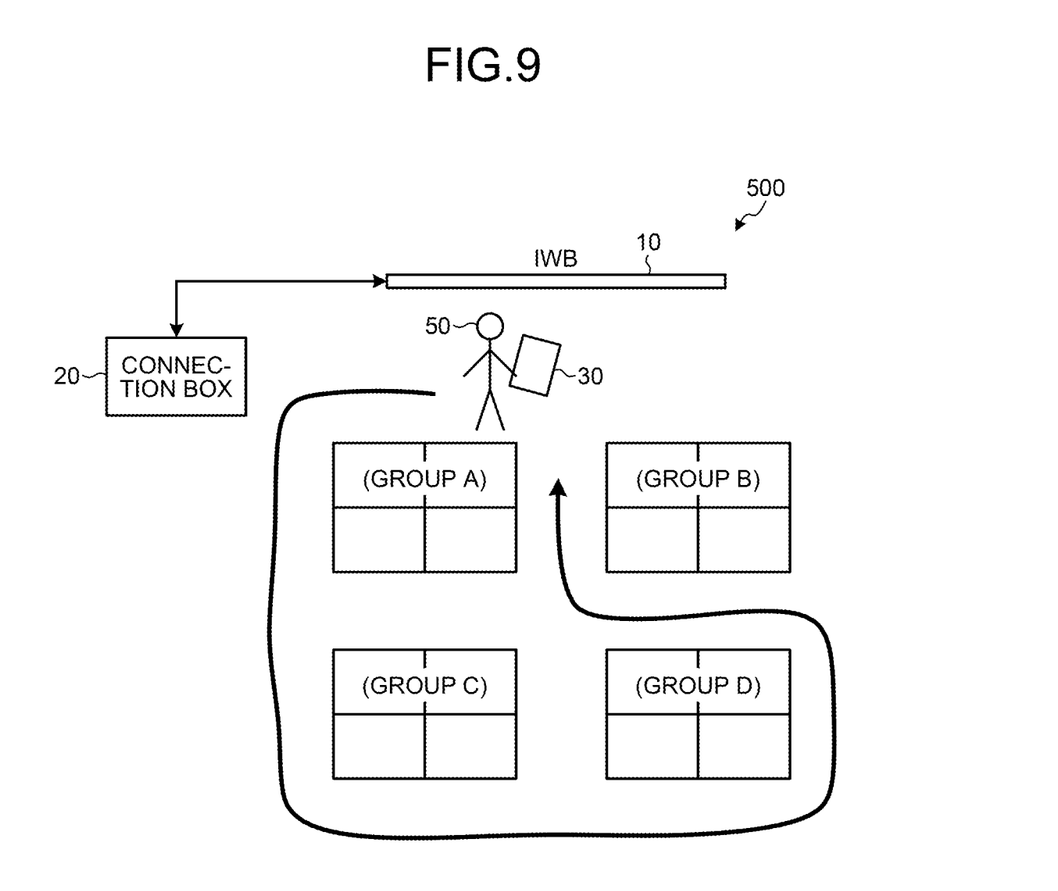
FIG. 9 is a diagram for explaining an application example of the information sharing system according to the first embodiment.

Subsequently, an application example of the information sharing system 1 according to the first embodiment is explained. Here, an example where the information sharing system 1 is applied to an educational establishment is explained. As illustrated in FIG. 9, the IWB 10 is set up in a classroom 500, and the connection box 20 is brought into the classroom 500 and connected to the IWB 10 by a cable. Furthermore, assume that in the classroom 500, four groups A to D each consisting of four students sitting at four desks brought together are formed, and, in each of the groups A to D, students who are members of each group are creating materials showing learning outcomes.

A teacher 50 starts a terminal device 30, and connects the terminal device 30 to the connection box 20 by wireless communication. Furthermore, the teacher 50 sets a destination to share, for example, by operating the terminal device 30. As information identifying the destination to share, for example, information identifying a class, such as a class name, can be used. The terminal device 30 transmits destination-to-share identifying information which identifies the set destination to share to the connection box 20. When the connection box 20 has received the destination-to-share identifying information, the connection box 20 allocates an area corresponding to the destination-to-share identifying information within the storage unit 205.

For example, the teacher 50 carries the terminal device 30, and goes the rounds of the groups A to D in the order of groups A, B, C, and D. Then, in each of locations of the groups A to D, the teacher 50 operates the terminal device 30 and captures an image of materials being created by each of the groups A to D, and transmits the captured image to the connection box 20. At this time, the teacher 50 adds group identifying information indicating a corresponding group to the captured image by performing a predetermined operation on the terminal device 30, and transmits the captured image added with the group identifying information to the connection box 20.

The connection box 20 sequentially receives captured images of the groups A to D transmitted from the terminal device 30, and stores the received captured images in the area identified by the destination-to-share identifying information within the storage unit 205; furthermore, each time the connection box 20 has received a captured image, the connection box 20 renews a display control signal and transmits the display control signal to the IWB 10. The captured images of the groups A to D captured by the terminal device 30 are displayed on the display unit 120 of the IWB 10, for example, in chronological order with respect to each of the groups A to D. Members of the groups A to D can share information on the materials created in the groups A to D by viewing a display screen of the IWB 10.

Furthermore, the information sharing system 1 communicates with the connection box 20 by wireless communication, and causes the connection box 20 to automatically transmit a captured image transmitted from the terminal device 30 to the IWB 10 so as to display the captured image on the IWB 10. Therefore, even if the teacher 50 does not go back to the location of the IWB 10, the display screen of the IWB 10 is updated to the latest display screen.

Moreover, the captured image displayed on the IWB 10 is stored in the area identified by the destination-to-share identifying information within the storage unit 205. Therefore, even after display content of the display unit 120 of the IWB 10 is cleared at the end of the class, the captured images captured in the class can be browsed in chronological order with respect to each of the groups.

Second Embodiment

Figure 10:
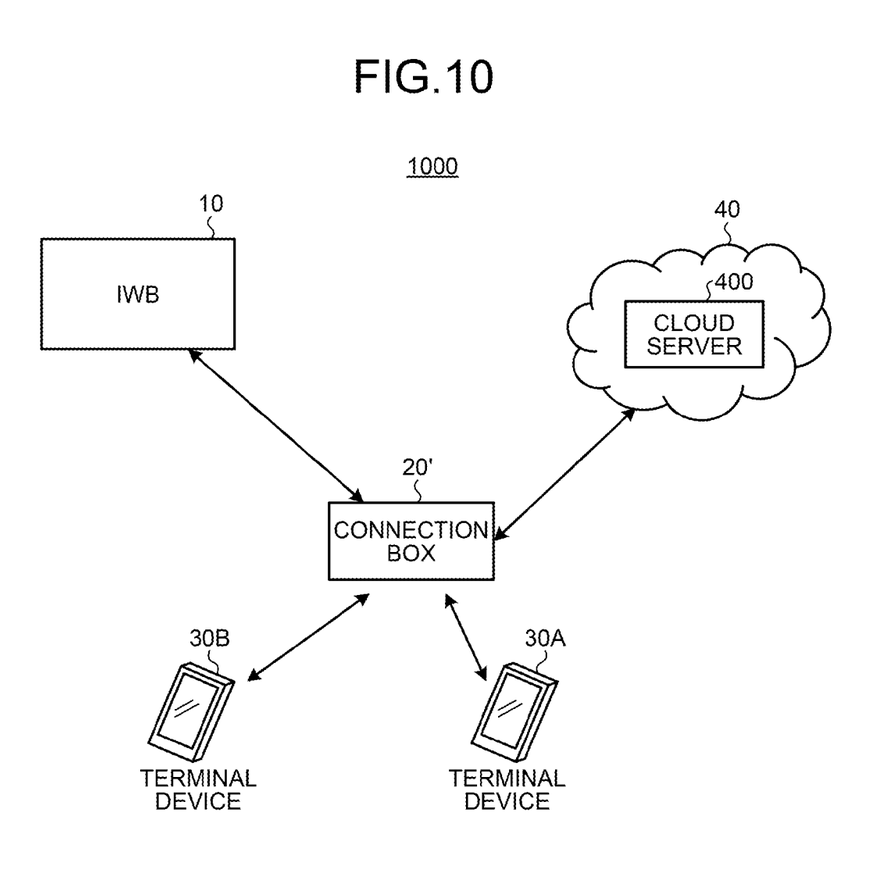
FIG. 10 is a diagram showing a configuration of an example of an information sharing system according to a second embodiment of the present invention.

Subsequently, a second embodiment of the present invention is explained. FIG. 10 shows a configuration of an example of an information sharing system according to the second embodiment. In FIG. 10, an information sharing system 1000 is an example where a network cloud 40 is connected to the information sharing system 1 shown in FIG. 1. The network cloud 40 is a network group that includes a plurality of computers connected to one another via a network and offers only input and output as a black box of which the inside is hidden from the outside. In the network cloud 40, a cloud server 400 is composed of one or more computers. A connection box 20' is connected to the network cloud 40, and performs communication with the cloud server 400.

Furthermore, in FIG. 10, the connection box 20' has a configuration in which a function of connecting to the network cloud 40 is added to the connection box 20 in the first embodiment. In fact, the function of the communication unit 202 in the connection box 20 enables the connection box 20' to connect to the network cloud 40 in conjunction with the IWB 10.

Moreover, in the example of FIG. 10, two terminal devices 30A and 30B are connected to the connection box 20'. These terminal devices 30A and 30B are identical with the above-described terminal devices 30, and, as described above, multiple terminal devices 30A and 30B can be connected to the connection box 20'.

Figure 11:
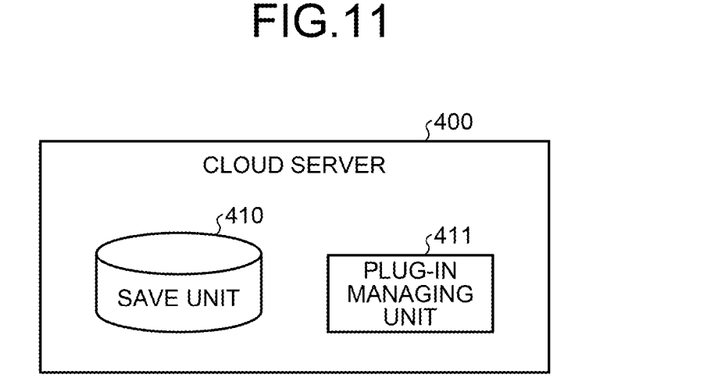
FIG. 11 is an example of a functional block diagram for explaining functions of a cloud server according to the second embodiment.

FIG. 11 is an example of a functional block diagram for explaining functions of the cloud server 400 according to the second embodiment. In FIG. 11, the cloud server 400 includes a save unit 410 and a plug-in managing unit 411.

The save unit 410 saves a captured image transmitted from the connection box 20'. That is, the connection box 20' stores a captured image transmitted from any of the terminal devices 30A and 30B in the storage unit 205. Furthermore, the connection box 20' transmits the captured image to the cloud server 400. The cloud server 400 saves the captured image transmitted from the connection box 20' in the save unit 410.

The storage unit 205 of the connection box 20' has a limitation in storage capacity, so the storage unit 205 is suited for short-term storage of captured images. For example, the period of storing captured images or the storage capacity can be limited in such a manner that only the last captured image acquired when the connection box 20' has been activated can be stored in the storage unit 205, or only captured images for a week can be stored in the storage unit 205.

On the other hand, the save unit 410 of the cloud server 400 can save far more captured images than the storage unit 205 can store. For example, the save unit 410 can save all captured images transmitted from the connection box 20' in the past. Furthermore, the save unit 410 can save all captured images transmitted from multiple connection boxes 20'. In this case, even when any of the multiple connection boxes 20' is used, a user can retrieve an intended captured image from the save unit 410 and browse the captured image.

Furthermore, it is possible to charge a fee for the use of the cloud server 400. For example, a user can be charged according to the period to save captured images in the save unit 410. Furthermore, a user can be charged according to the amount of information saved in the save unit 410.

The plug-in managing unit 411 manages a plug-in program package that can be added into the connection box 20'. The plug-in program package here means a package of a plug-in program body and an installation program for executing a process of installing the plug-in program body on the connection box 20'. For example, when a new plug-in program has been added or an existing plug-in program has been updated by a developer of the plug-in program, a package of the added or updated plug-in program is supplied to the cloud server 400. The plug-in managing unit 411 stores the supplied plug-in program package in storage (not shown) and manages the stored plug-in program package.

For example, the connection box 20' gets access to the cloud server 400 at predetermined timing, such as at each activation of the connection box 20', periodically, and acquires information of managed plug-in programs from the plug-in managing unit 411. Then, if a plug-in program package which has not been installed on the connection box 20' is being managed by the plug-in managing unit 411, the connection box 20' acquires the plug-in program package by downloading it via a network. In the connection box 20', for example, an OS runs an installation program included in the acquired plug-in program package, and installs the plug-in program on the host server layer 2010. Accordingly, the connection box 20' can execute a new function.

Figure 12:
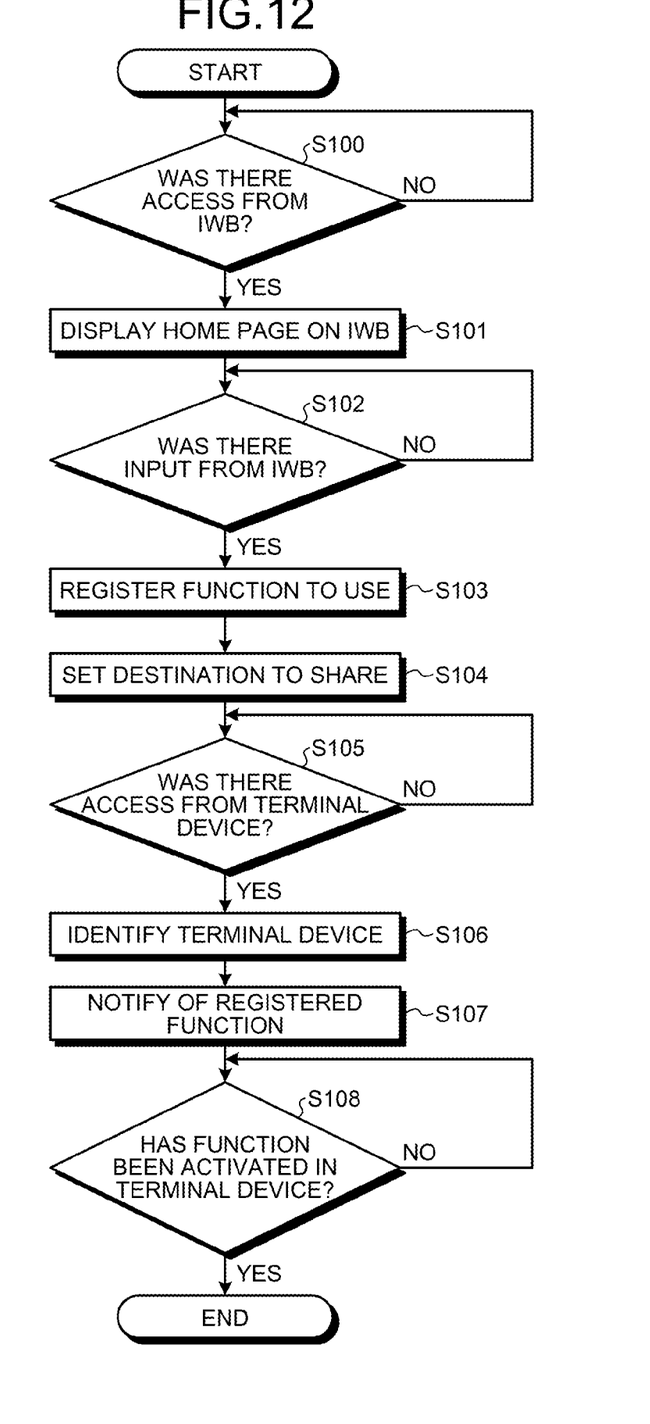
FIG. 12 is a flowchart showing an example of a sequence of activation of a connection box according to the second embodiment.

FIG. 12 is a flowchart showing an example of a sequence of activation of the connection box 20' according to the second embodiment. Incidentally, in a process of this flowchart, as many terminal devices 30A and 30B as the predetermined number of terminal devices are subject to the process.

At Step S100, the connection box 20' waits for access from the IWB 10 to the communication unit 202. When the connection box 20' has been accessed by the IWB 10, the server unit 203 assigns an address (an IP address) to the IWB 10, and causes the IWB 10 to display thereon a home page as an initial screen of the information sharing system 1000 at the next Step S101.

For example, an HTML file as a display control signal for displaying the home page is stored in the storage unit 205 of the connection box 20' in advance. This HTML file is described, for example, so that a screen on which buttons or the like for selecting any of functions that can be executed by a plug-in program installed on the connection box 20' are arranged is displayed. When the connection box 20' has been accessed by the IWB 10, the control unit 206 transmits this HTML file to the IWB 10 through the communication unit 202. When having received the HTML file, the IWB 10 causes the browser to read the received HTML file and display thereon a screen according to description of the HTML file.

At the next Step S102, the connection box 20' waits for input from the IWB 10. More specifically, the connection box 20' waits until information indicating whether any of function selection buttons arranged on the home page displayed on the IWB 10 has been manipulated or not and, if a function selection button has been manipulated, which button the manipulated function selection button is has been transmitted from the IWB 10. When there was input from the IWB 10, the process moves on to Step S103, and the connection box 20' stores and registers information indicating a function to use, for example, in the RAM 213 in accordance with the information transmitted from the IWB 10.

At the next Step S104, the connection box 20' sets a destination to share to share information through the use of the function registered at Step S103. As a more concrete example, the connection box 20' sets a destination to share by allocating a given area within the storage unit 205 as the destination to share and setting a destination-to-share ID for identifying the destination to share for the allocated area. Furthermore, the connection box 20' allocates a given area within the save unit 410 of the cloud server 400 as a destination to share, and assigns a destination-to-share ID to the destination to share.

Incidentally, the destination-to-share ID of the destination to share set in the storage unit 205 and the destination-to-share ID of the destination to share set in the save unit 410 can be the same, or can be different. When different destination-to-share IDs are used in the storage unit 205 and the save unit 410, for example, the cloud server 400 can create a table showing a correspondence relation between these destination-to-share IDs.

At the next Step S105, the connection box 20' waits for access from the terminal devices 30A, 30B, . . . to the communication unit 202. When the connection box 20' has been accessed, for example, by the terminal device 30A, the server unit 203 assigns an address (an IP address) to the terminal device 30A, and the authenticating unit 204 authenticates the terminal device 30A. For example, the authenticating unit 204 requests the terminal device 30A to send an SSID, and checks the SSID sent from the terminal device 30A in response to the request. When the authenticating unit 204 has determined that the SSID sent from the terminal device 30A is valid, the authenticating unit 204 certifies the terminal device 30A.

When the terminal device 30A has been certified by the authenticating unit 204, the process moves on to the next Step S106. At Step S106, the connection box 20' acquires identification information identifying the terminal device 30A, and identifies the terminal device 30A. For example, the control unit 206 acquires a MAC address of the terminal device 30A from information exchanged between the wireless communication unit 201 and the terminal device 30A, and stores this MAC address in, for example, the RAM 213 in a manner associated with the address (the IP address) of the terminal device 30A.

At the next Step S107, the connection box 20' notifies the certified terminal device 30A of the use of the function registered at Step S103.

Incidentally, the processes at Steps S105 to S107 are loop processing performed on the terminal devices 30A, 30B, . . . to be subject to the process. The time-out period can be set with respect to a repeat of the loop processing, and, if the time elapsed since the start of the process at the first Step S105 exceeds the time-out period, the process can be forcibly exited from the loop and move on to Step S108.

At the next Step S108, the connection box 20' waits until the function notified at Step S107 has been activated in each of the terminal devices 30A, 30B, . . . having been subjected to the processes at Steps S105 to S107. When the connection box 20' has confirmed the activation of the function in the terminal devices 30A, 30B, . . . , a series of the processes in the flowchart shown in FIG. 12 is finished.

Figure 13:
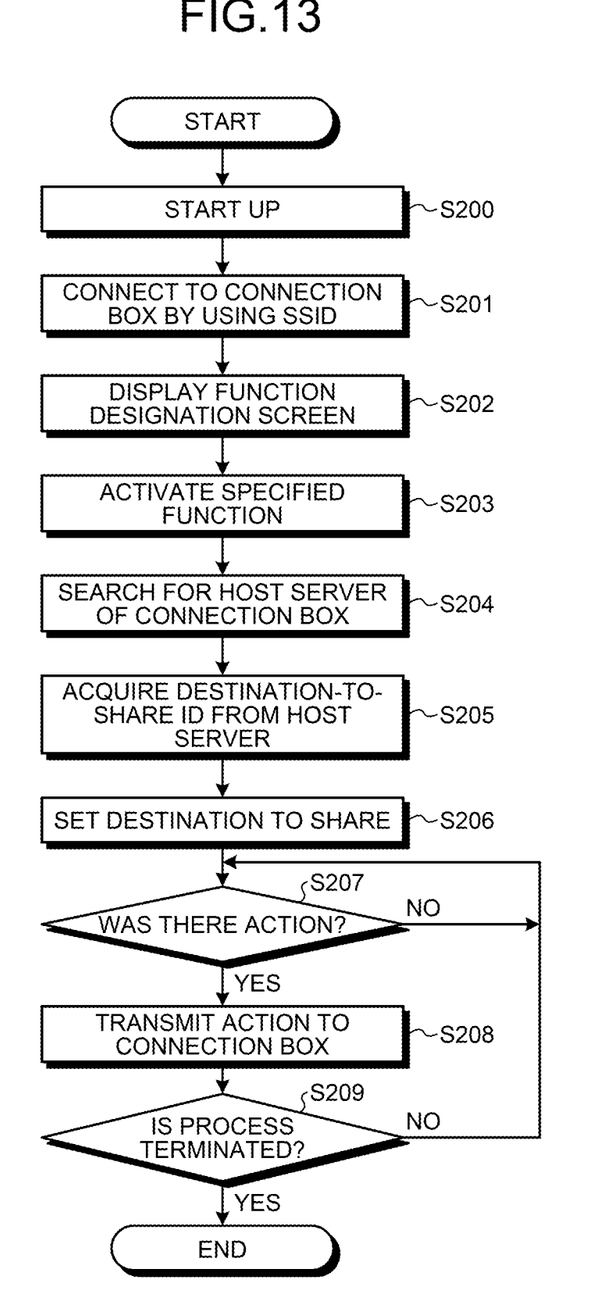
FIG. 13 is a flowchart showing an example of a process performed by a terminal device according to the second embodiment.

FIG. 13 is a flowchart showing an example of a process performed by the terminal devices 30A, 30B, . . . according to the second embodiment. Incidentally, the terminal devices 30A, 30B, . . . perform the same process, so the process is explained taking the terminal device 30A as an example.

At Step S200, the terminal device 30A is started, for example, in accordance with a user operation performed on the terminal device 30A. When the terminal device 30A has been started, at the next Step S201, the terminal device 30A performs communication with the connection box 20', and, after authentication using an SSID, the terminal device 30A is connected to the connection box 20' and can perform data communication with the connection box 20'.

At the next Step S202, the terminal device 30A displays a function designation screen for specifying a function on the UI unit 302 in accordance with the function notified from the connection box 20' at Step S107 of the flowchart shown in FIG. 12. When an app for realizing the function specified by the connection box 20' has been installed on the terminal device 30A, the process moves on to the next Step S203, and the terminal device 30A activates the function.

On the other hand, when an app for realizing the function notified from the connection box 20' has not been installed on the terminal device 30A, the terminal device 30A displays a screen prompting the installation of the app on the UI unit 302. When the app has been downloaded, for example from a site of a vendor of the app in accordance with a user operation and installed on the terminal device 30A, the process moves on to the next Step S203, and the function is activated by the terminal device 30A.

When the function has been activated at Step S203, the process moves on to the next Step S204. At Step S204, the terminal device 30A searches for a host server of the host server layer 2010 of the connection box 20'. When the host server has been found, at the next Step S205, the terminal device 30A requests the host server to send a destination-to-share ID indicating a destination to share information. When the terminal device 30A has acquired a destination-to-share ID from the connection box 20' in response to the request, the process moves on to the next Step S206. At Step S206, the terminal device 30A sets a destination to share on the basis of the destination-to-share ID acquired at Step S205.

Incidentally, a process of acquiring group identifying information can be performed, for example, in the stage of Step S206.

At Step S207, the terminal device 30A waits for an action with respect to the function activated at Step S203. For example, when the activated function is a captured-image browsing function, this action is an image capturing action by the image capturing unit 301 of the terminal device 30A. When an image capturing action has been taken, for example, in accordance with a user operation performed on the terminal device 30A, it is determined that there was an action, and the process moves on to Step S208.

At Step S208, the terminal device 30A transmits the action to the connection box 20'. In the case of the above-mentioned captured-image browsing function, at Step S208, the terminal device 30A transmits a captured image obtained through the image capturing action to the connection box 20'.

The connection box 20' stores the captured image transmitted as the action from the terminal device 30A in an area of the storage unit 205 indicated by the destination-to-share ID, and transmits the captured image to the cloud server 400. Furthermore, the connection box 20' generates a display control signal for displaying the captured image, and transmits the generated display control signal to the IWB 10. The IWB 10 displays thereon a screen including the captured image in accordance with the display control signal.

Incidentally, the action with respect to the function is not limited to the image capturing action. For example, the action can be an action of clearing (erasing) content of the display screen of the IWB 10 or an instruction to read a captured image stored or saved in the storage unit 205 or the save unit 410 and display the captured image on the IWB 10.

At the next Step S209, the terminal device 30A determines whether or not a series of the processes is terminated. For example, when the currently-activated function is stopped by a user operation or the like, the terminal device 30A determines that the process is terminated. Besides this, when an instruction to terminate the process input in accordance with a user operation performed on the IWB 10 has been transmitted to the connection box 20', it can be determined that the process is terminated. In this case, the connection box 20' notifies the terminal device 30A that termination of the process has been instructed by the IWB 10.

When the terminal device 30A has determined that the process is not terminated, the process returns to Step S207; on the other hand, when the terminal device 30A has determined that the process is terminated, a series of the processes in the flowchart shown in FIG. 13 is finished.

As explained above, according to the second embodiment, information can be saved on the cloud server 400 over the long term; therefore, more efficient use of saved information can be achieved by separating the purpose of use from the storage unit 205 of the connection box 20'. Furthermore, a plug-in program package to be installed on the connection box 20' is managed by the cloud server 400; therefore, it is easy to add or update a plug-in program in the connection box 20'.

Incidentally, there is described above the processes in the flowcharts shown in FIGS. 12 and 13 are applied to the second embodiment; these processes can also be applied to the first embodiment. When the processes in the flowcharts shown in FIGS. 12 and 13 are applied to the first embodiment, the connection box 20' is replaced by the connection box 20, and processes related to the cloud server 400 are omitted.

Furthermore, there is described above captured images captured by the terminal devices 30A, 30B, . . . are transmitted to the connection box 20'; however, information transmitted from the terminal devices 30A, 30B, . . . to the connection box 20' is not limited to captured images. For example, the terminal devices 30A, 30B, . . . can transmit text data or audio data to the connection box 20', and can also transmit moving images or images by computer graphics to the connection box 20'.

Moreover, there is described above the multiple terminal devices 30A, 30B, . . . have the same authority for use of functions; however, it is not limited to this example, and the terminal devices 30A, 30B, . . . can use different functions. For example, in the above-described example of the educational establishment, when the teacher 50 and students have the terminal devices 30A, 30B, . . . , respectively, as against the authority for use of functions of, for example, the terminal device 30A used by the teacher 50, the scope of authority for use of functions of, for example, the terminal devices 30B used by the students can be limited.

According to the present invention, it is possible to construct an information sharing system including an IWB more easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. An information sharing system comprising a display sharing device, a terminal device, and a connecting device, wherein
the display sharing device includes:
a first memory having first computer readable instructions stored thereon; and
at least one first procesor configured to execute the first computer readable instructions to,
perform communication with an external device, and
a display unit that displays thereon a screen based on information acquired from the at least one first processor;
the terminal device includes:
a second memory having second computer readable instructions stored thereon; and
at least one second processor configured to execute the second computer readable instructions to,
obtain a captured image by capturing an image of a subject, and
perform wireless communication with an external device; and
the connecting device includes:
a third memory having third computer readable instructions stored thereon;
a first storage device configured to store therein information; and
at least one third processor configured to execute the third computer readable instructions to,
connect to and perform communication with the display sharing device,
connect by wireless communication and perform communication with the terminal device,
authenticate the terminal device through the wireless communication performed,
set a destination to share information in the first storage device,
transfer the captured image, which has been transmitted from the authenticated terminal device and received by the connecting device, to the set destination to share,
generate display information for displaying the captured image, and
transmit the generated display information to the display sharing device.

2. The information sharing system according to claim 1, further comprising a server system including one or more information processing apparatuses, wherein
the server system includes a second storage device configured to store therein information, and
the at least one third processor is further configured to set the destination to share in the second storage device.

3. The information sharing system according to claim 1, wherein the at least one third processor is further configured to store on the first storage device one or more functions to be executed by the display sharing device and the terminal device, and select a function to be executed by the display sharing device and the terminal device from the stored functions in accordance with an instruction transmitted from the display sharing device.

4. The information sharing system according to claim 3, wherein
the server system further includes at least one fourth processor configured to,
store on the second storage device a package including a configuration for executing a function, and
acquire the package from the second storage device, and
add the selected function.

5. The information sharing system according to claim 4, wherein
The at least one fourth processor is configured to check packages stored in the second storage device at a desired timing, and, when there exists a package including a configuration for executing a function which is not included in the already-stored functions, acquires the package.

6. The information sharing system according to claim 1, wherein
the at least one third processor is further configured to add group identifying information indicating a group to which the terminal device belongs to the authenticated terminal device.

7. The information sharing system according to claim 6, wherein
the at least one third processor is further configured to add the group identifying information to the terminal device in accordance with desired information associated with the terminal device.

8. The information sharing system according to claim 6, wherein
the at least one third processor is further configured to add the group identifying information to the terminal device in accordance with information transmitted from the terminal device.

9. The information sharing system according to claim 1, wherein
the at least one third processor is further configured to assign addresses for communication to the display sharing device connected to the external device and the terminal device and set communication paths, respectively.

10. The information sharing system according to claim 2, wherein
the server system is configured to charge a fee according to a usage state of the second storage device.

11. An information sharing method comprising:
communicating, using at least one processor, with a display sharing device that displays thereon a screen based on information acquired through communication;
communicating, using the at least one processor, with a terminal device, the terminal device acquiring a captured image by capturing an image of a subject, by wireless communication;
authenticating, using the at least one processor, the terminal device using wireless communication;
setting, using the at least one processor, a destination to share information;
transferring, using the at least one processor, the captured image received from the authenticated terminal device to the set destination to share;
generating, using the at least one processor, display information for displaying the captured image received from the authenticated terminal device; and
transmitting, using the at least one processor, the generated display information to the display sharing device.

12. A connecting device comprising:
a memory having computer readable instructions stored thereon;
a storage device that stores therein information; and
at least one processor configured to execute the computer readable instructions to, communicate with a display sharing device which displays thereon a screen based on information acquired through communication, wirelessly communicate with a terminal device, the terminal device acquiring a captured image by capturing an image of a subject, by wireless communication, authenticating the terminal device, set a destination to share information in the storage device, transfer the captured image, which has been transmitted from the authenticated terminal device, to the set destination to share, generate display information for displaying the captured image, and transmit the generated display information to the display sharing device.

13. The information sharing method according to claim 11, further comprising:

storing, using the at least one processor, one or more functions to be executed by the display sharing device and the terminal device; and selecting, using the at least one processor, a function to be executed by the display sharing device and the terminal device from the stored functions in accordance with an instruction received from the display sharing device.

14. The information sharing method according to claim 11, further comprising:

adding, using the at least one processor, group identifying information indicating a group to which the terminal device belongs to the authenticated terminal device.

15. The information sharing method according to claim 14, further comprising:

adding, using the at least one processor, the group identifying information to the terminal device in accordance with desired information associated with the terminal device.

16. The information sharing method according to claim 14, further comprising:

adding, using the at least one processor, the group identifying information to the terminal device in accordance with information transmitted from the terminal device.

17. The information sharing method according to claim 14, further comprising:

assigning, using the at least one processor, addresses for communication to the display sharing device connected to the external device and the terminal device and set communication paths, respectively.

18. The connecting device according to claim 12, wherein the at least one processor is further configured to:

store on the storage device one or more functions to be executed by the display sharing device and the terminal device; and select a function to be executed by the display sharing device and the terminal device from the stored functions in accordance with an instruction transmitted from the display sharing device.

19. The connecting device according to claim 12, wherein the at least one processor is further configured to:

add group identifying information indicating a group to which the terminal device belongs to the authenticated terminal device.

20. The connecting device according to claim 19, wherein the at least one processor is further configured to:

add the group identifying information to the terminal device in accordance with desired information associated with the terminal device.

\* \* \* \* \*